(12) United States Patent
Hou

(10) Patent No.: US 11,231,353 B2
(45) Date of Patent: Jan. 25, 2022

(54) SCRATCH ABRASION TESTER AND TESTING METHOD

(71) Applicant: The Yokohama Rubber Co., LTD., Tokyo (JP)

(72) Inventor: Gang Hou, Hiratsuka (JP)

(73) Assignee: The Yokohama Rubber Co., LTD.

( * ) Notice: Subject to any disclaimer, the term of this patent is extended or adjusted under 35 U.S.C. 154(b) by 14 days.

(21) Appl. No.: 16/920,354

(22) Filed: Jul. 2, 2020

(65) Prior Publication Data

US 2020/0333227 A1 Oct. 22, 2020

Related U.S. Application Data

(62) Division of application No. 15/570,709, filed as application No. PCT/JP2016/057531 on Mar. 10, 2016, now Pat. No. 10,732,084.

(30) Foreign Application Priority Data

Apr. 30, 2015 (JP) .............................. JP2015-092686

(51) Int. Cl.
*G01N 3/56* (2006.01)
*G01N 3/02* (2006.01)

(52) U.S. Cl.
CPC ................ *G01N 3/56* (2013.01); *G01N 3/02* (2013.01)

(58) Field of Classification Search
CPC .... G01N 3/56; G01N 3/02; G01N 2203/0033; G01N 2203/005; G01N 2203/0226; G01N 2203/0282; G01N 2203/0641; G01N 2203/0676; G01N 2203/0682; G01N 2203/0694

See application file for complete search history.

(56) References Cited

U.S. PATENT DOCUMENTS

| 6,321,586 B1 | 11/2001 | Wojtowicz et al. |
| 2013/0036791 A1 | 2/2013 | Shibata |

FOREIGN PATENT DOCUMENTS

| CN | 200989873 | 12/2007 |
| CN | 201004038 | 1/2008 |
| CN | 202362219 | 8/2012 |

(Continued)

OTHER PUBLICATIONS

International Search Report for International Application No. PCT/JP2016/057531 dated May 17, 2016, 4 pages, Japan.

*Primary Examiner* — Herbert K Roberts
*Assistant Examiner* — John M Royston
(74) *Attorney, Agent, or Firm* — Thorpe North & Western

(57) ABSTRACT

An abrasion tester and testing method. The testing method comprises setting a running speed of a rubber sample fixed to an outer surface of an annular belt member stretched between a pair of pulleys to a desired speed; setting a pressing load applied by a contact member to a desired pressing load via an anchor member; selecting, as the contact member, a desired contact member from a plurality of types of contact members with different rubber sample surface contacting tip specifications; pressing the contact member against the surface of the rubber sample running by the rotation of the pulleys; and obtaining an amount of scratch abrasion of the rubber sample using a calculation unit on the basis of a cross-sectional shape of the surface of the rubber sample detected by a shape sensor.

5 Claims, 6 Drawing Sheets

(56) References Cited

FOREIGN PATENT DOCUMENTS

| | | | |
|---|---|---|---|
| CN | 102770748 | | 11/2012 |
| JP | 2001-088922 | | 4/2001 |
| JP | 2004-020319 | | 1/2004 |
| JP | 2004020319 A | * | 1/2004 |
| JP | 2010-260645 | | 11/2010 |
| JP | 2011-257187 | | 12/2011 |
| JP | 2012-202811 | | 10/2012 |
| JP | 2012-242200 | | 12/2012 |
| JP | 2012242200 A | * | 12/2012 |
| WO | WO 2009-028667 | | 3/2009 |
| WO | WO 2011/105498 | | 9/2011 |

* cited by examiner ously, by changing a pressing load applied by the contact member, the scratch abrasion resistance of the rubber sample can be tested on the basis of data in which an anchor member is changed.

SCRATCH ABRASION TESTER AND TESTING METHOD

RELATED APPLICATION

This application is a divisional of U.S. patent application Ser. No. 15/570,709, filed on Oct. 30, 2017, which is the National Stage of International Patent Application No. PCT/JP2016/057531, filed on Mar. 10, 2016, which claims the benefit of priority from Japan Patent Application No. 2015-092686, filed on Apr. 30, 2015.

TECHNICAL FIELD

The present technology relates to a scratch abrasion tester and testing method and particularly relates to a scratch abrasion tester and testing method that can accurately estimate the scratch abrasion resistance of an upper cover rubber of a conveyor belt when actually used.

BACKGROUND ART

Various objects, including mineral resources such as iron ore and limestone, are conveyed by a conveyor belt. When being conveyed by the conveyor belt, the objects to be conveyed are fed onto an upper cover rubber of the conveyor belt from a hopper or another conveyor belt. The fed objects to be conveyed are loaded on the upper cover rubber and conveyed in a running direction of the conveyor belt. When the objects to be conveyed are fed onto the upper cover rubber of the conveyor belt, the upper cover rubber is subject to impact, and when the surfaces of the objects to be conveyed are sharp, the upper cover rubber sometimes sustains cut damage. When the objects to be conveyed are loaded on the upper cover rubber and conveyed, the upper cover rubber is subject to wear as a result of the objects to be conveyed sliding on the upper cover rubber. Thus, in the known art, various proposals have been made (see Japanese Unexamined Patent Application Publication No. 2001-88922A for example) in order to improve the wear resistance.

When sharp objects such as iron ore are conveyed, they slide while stuck into the upper cover rubber. This causes significant scratch abrasion. Scratch abrasion can easily reach the core layer of the conveyor belt, making it advantageous to accurately estimate the scratch abrasion resistance of the upper cover rubber.

Examples of testers for evaluating the wear resistance of rubber known in the art include the DIN (Deutsches Institut für Normung (German Institute for Standardization) abrasion tester and the Williams abrasion tester. These abrasion testers are not for obtaining the amount of scratch abrasion. Thus, there is a demand for a tester with a novel configuration for accurately estimating the scratch abrasion resistance of an upper cover rubber of a conveyor belt when actually used.

SUMMARY

The present technology provides a scratch abrasion tester and testing method that accurately estimate the scratch abrasion resistance of an upper cover rubber of a conveyor belt when actually used.

A scratch abrasion tester according to an embodiment of the present technology comprises:
a pair of pulleys;
an annular belt member stretched between the pair of pulleys;
a rubber sample fixed to an outer surface of the belt member;
a contact member with pointed tips that are able to come into contact with a surface of the rubber sample;
a pressing mechanism that presses the tips of the contact member against the surface of the rubber sample; and
an anchor member for changing a pressing load applied by the contact member;
a running speed of the rubber sample being variable,
the contact member including a plurality of types of contact members with different tip specifications,
the contact member that presses against the surface of the rubber sample being discretionarily selected from the plurality of types of contact members, and
the selected contact member being pressed against the surface of the rubber sample.

A scratch abrasion testing method according to an embodiment of the present technology, in which an annular belt member with a rubber sample fixed to an outer surface thereof is stretched between a pair of pulleys and a contact member with pointed tips is pressed against a surface of the rubber sample by a pressing mechanism, comprises the steps of:
setting a running speed of the rubber sample to a desired speed;
setting a pressing load applied by the contact member to a desired pressing load via an anchor member;
selecting, as the contact member, a desired contact member from a plurality of types of contact members with different rubber sample surface contacting tip specifications; and
pressing the selected contact member against the surface of the rubber sample.

According to an embodiment of the present technology, the running speed of the rubber sample and the pressing load applied by the contact member can be set as desired. The contact member with the desired tip specification can be pressed against the surface of the rubber sample. Additionally, because the rubber sample fixed to the outer surface of the annular belt member is used, in testing for the scratch abrasion resistance of the rubber sample with the same specifications as the rubber used in the upper cover rubber of the conveyor belt, evaluation under similar conditions to that of the actual usage environment of the conveyor belt can be performed. Accordingly, the scratch abrasion resistance of the upper cover rubber of the conveyor belt when actually used can be accurately estimated. Additionally, the effects of tension on the scratch abrasion resistance of the conveyor belt can also be determined.

By a shape sensor configured to detect the cross-sectional shape of the surface of the rubber sample, and a calculation unit configured to obtain an amount of scratch abrasion of the rubber sample on the basis of detection data from the shape sensor being provided, the amount of scratch abrasion of the rubber sample for a discretionary period can be quickly determined. Additionally, the amount of scratch abrasion of the rubber sample can be determined without removing the rubber sample from the pair of pulleys.

By the support portion that supports an inner surface of the belt member being disposed between the pair of pulleys, and the contact member being pressed against the surface of the rubber sample at a position where the support portion supports the belt member and a position where the belt member is not supported, the effect of the support portion on the scratch abrasion resistance can be determined. Accordingly, the scratch abrasion resistance of the upper cover rubber of the conveyor belt when actually used can be more accurately estimated.

The scratch abrasion tester according to an embodiment of the present technology can further comprise a load sensor configured to successively detect the pressing load acting on the contact member and a load in a running direction of the rubber sample acting on the contact member. As a result, the kinetic friction coefficient of the rubber sample can be determined.

A temperature control mechanism that can vary an external environment temperature of the rubber sample can also be provided. This allows the external environment temperature of the rubber sample to be set to the desired temperature, allowing the evaluation to be performed under conditions even more similar to that of the actual usage environment of the conveyor belt.

A temperature sensor that detects a surface temperature of the rubber sample can be provided. This allows the change in surface temperature of the rubber sample during evaluation to be measured and the energy produced by abrasion of the rubber sample to be determined.

DETAILED DESCRIPTION

Figure 1:
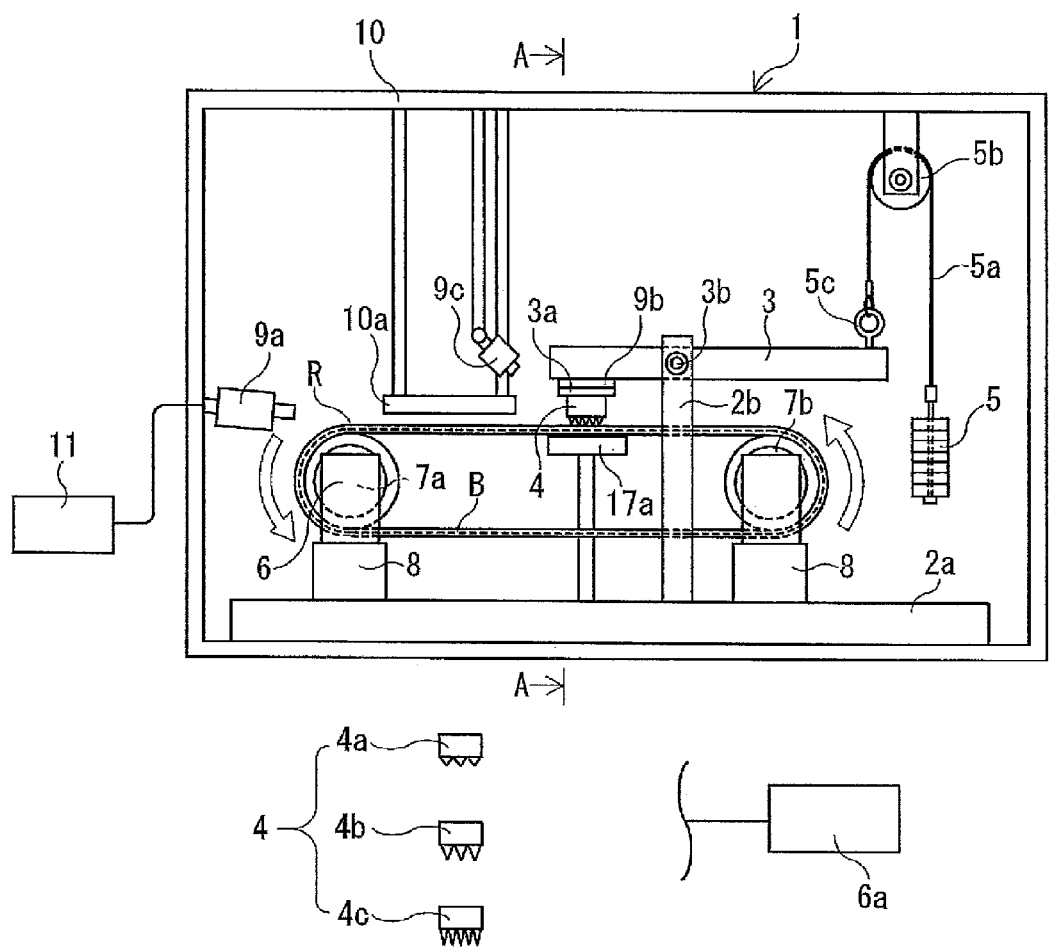
FIG. 1 is an explanatory diagram illustrating, in a front view, a scratch abrasion tester according to an embodiment of the present technology.

Below, a scratch abrasion tester and testing method according to embodiments of the present technology will be described on the basis of embodiments illustrated in the drawings.

Figure 6:
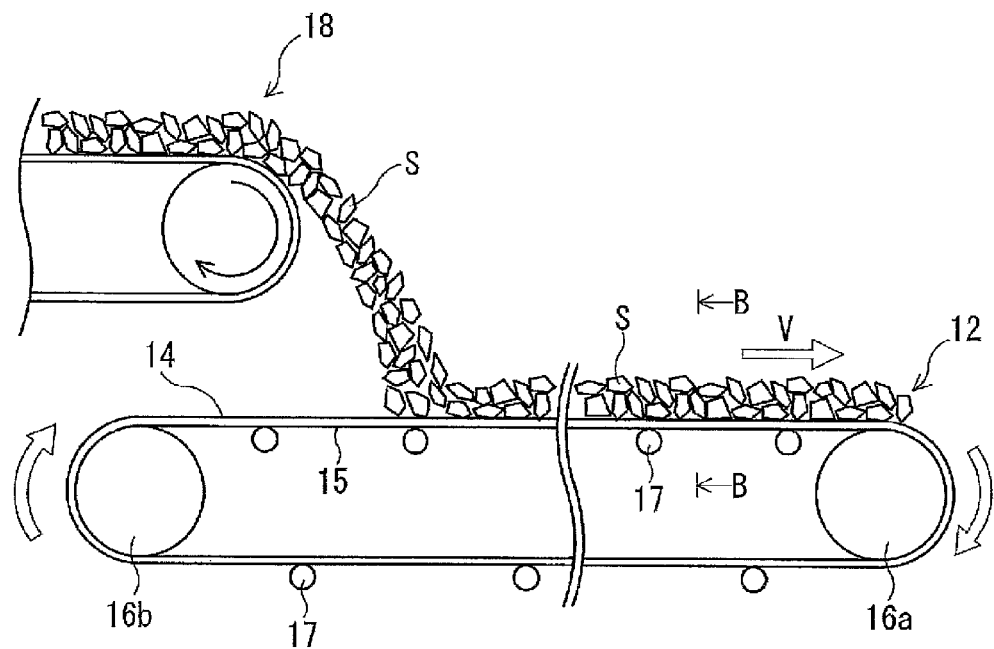
FIG. 6 is an explanatory diagram illustrating a conveyor belt line in a simplified manner.
Figure 7:
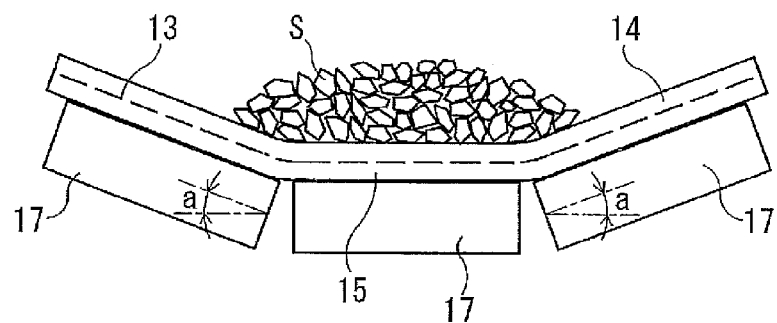
FIG. 7 is a cross-sectional view taken along B-B of FIG. 6.

As illustrated in FIGS. 6 and 7, in a functioning conveyor belt line, objects to be conveyed S is conveyed by a conveyor belt 18, fed onto a conveyor belt 12, and conveyed to a conveying destination by the conveyor belt 12. The objects to be conveyed S may be fed onto the conveyor belt 12 by a hopper and the like. The conveyor belt 12 is stretched at a prescribed tension between pulleys 16a and 16b.

The conveyor belt 12 includes a core layer 13 including a core made of canvas, steel cord, or the like, and an upper cover rubber 14 and a lower cover rubber 15 that sandwich the core layer 13 therebetween. The core layer 13 is the member that bears the tension that causes the conveyor belt 12 to be stretched. The lower cover rubber 15 is supported by support rollers 17 on a carrier side of the conveyor belt 12, and the upper cover rubber 14 is supported by support rollers 17 on a return side of the conveyor belt 12. Three support rollers 17 are arranged on the carrier side of the conveyor belt 12 in the belt width direction. The conveyor belt 12 is supported by the support rollers 17 in a recessed manner at a prescribed trough angle a. When the pulley 16a on a drive side is rotationally driven, the conveyor belt 12 runs in one direction at a prescribed running speed V. The objects to be conveyed S are fed onto the upper cover rubber 14, and are loaded on the upper cover rubber 14 and conveyed.

Figure 2:
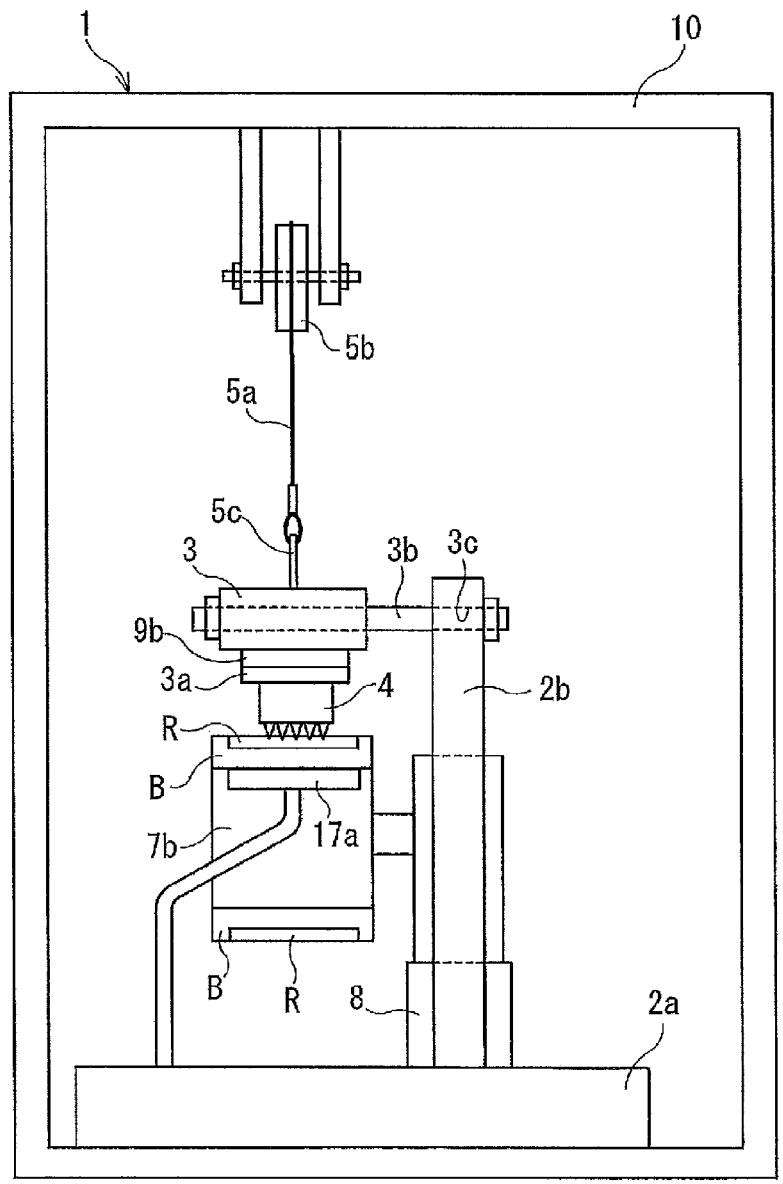
FIG. 2 is a cross-sectional view taken along A-A of FIG. 1.

A scratch abrasion tester 1 (hereinafter referred to as tester 1) according to an embodiment of the present technology illustrated in FIGS. 1 and 2 includes a pair of pulleys 7a, 7b, a contact member 4, an arm portion 3 to which the contact member 4 is removably attached, an anchor member 5 removably attached to the arm portion 3, and a control unit 6a. In the present embodiment, the tester 1 further includes a shape sensor 9a, a calculation unit 11, a support portion 17a, a load sensor 9b, a temperature sensor 9c, a heating plate 10a, and a casing 10 in which the components described above except for the control unit 6a and the calculation unit 11 are disposed.

The heating plate 10a is wider than a rubber sample R and can heat the rubber sample R to a desired temperature and maintain the rubber sample R at this temperature. In embodiments, when a configuration is provided in which the casing 10 functions, as a thermostatic chamber for maintaining the interior thereof at a desired temperature to set the rubber sample R to the desired temperature, the heating plate 10a can be omitted. In other embodiments, in addition to temperature, the interior of the casing 10 can be set to and maintained at a desired humidity.

The pulleys 7a, 7b are supported by support stands 8 disposed in an upright manner on a base 2a. At least one of the pulleys 7a, 7b can move horizontally so that the distance between the pulleys 7a, 7b is variable. The pulley 7a is driven in rotation by a drive motor 6. The pulley 7b freely rotates. The rotational speed of the pulley 7a is variable and can be set to a desired speed. The rotational speed is controlled by the control unit 6a. The pulley 7a and the drive motor 6 can have a configuration in which driving force is transferred via a transferring mechanism including a gear or a belt.

An annular belt member B is stretched between the pulleys 7a, 7b. The rubber sample R is fixed to the outer surface of the belt member B. In the present embodiment, a recessed portion is provided in the outer surface of the belt member B, and the rubber sample R fits in the recessed portion. The outer surface of the belt member B and the rubber sample R may be integrally formed via the friction therebetween or may be integrally formed via an adhesive applied thereto. Alternatively, the rubber sample R may be vulcanization-bonded to the outer surface of the belt member B for integration with the belt member B. In the present embodiment, the flat plate-like support portion 17a is disposed between the pulleys 7a, 7b to support the inner surface of the belt member B. The support portion 17a is an optional member that may be provided as necessary.

The arm portion 3 is supported on a post 2b disposed in an upright manner on the base 2a by a rotation shaft 3b, allowing for pivotal movement in the vertical direction. A pin 5c is provided on the arm portion 3 at a first end portion in the longitudinal direction. The pin 5c and the anchor member 5 are connected by a wire 5a that runs through a pulley 5b. The arm portion 3, the wire 5a, and the pulley 5b constitute a pressing mechanism described below that presses the contact member 4 against the surface of the rubber sample R.

The contact member 4 is attached to the arm portion 3 in a manner allowing the contact member 4 to be brought into contact with the surface of the rubber sample R. Specifically, the contact member 4 is removably attached to a holding portion 3a fixed to the arm portion 3 at a second end portion in the longitudinal direction.

Various types of contact members 4 are provided with different specifications (shape, hardness, material, and the like) for the tip that comes into contact with the surface of the rubber sample R. In other words, the contact members 4 (4a, 4b, 4c) have a contact surface with specifications similar to that of the objects to be conveyed S that are conveyed by the conveyor belt 12 that includes the upper cover rubber 14 with similar specifications to the rubber sample R.

For example, the sharpness, hardness, and the like of the objects to be conveyed S varies depending on the type of objects, such as iron ore or other fragmented rocks. Therefore, various types of contact members 4 having contact surfaces imitating these types of objects are provided. The desired contact member 4 can be selected from the various types of contact members 4 (4a, 4b, 4c) and attached to the holding portion 3a.

The anchor member 5 is removably attached to one end portion of the wire 5a. The number and types of the attached anchor member 5 can be changed as appropriate. The load of the anchor member 5 lifts up the pin 5c connected to the wire 5a, and the arm portion 3 pivots in the vertical direction about the rotation shaft 3b located in shaft hole 3c partway along the arm portion 3 in the longitudinal direction. This action presses the contact member 4 against the surface of the rubber sample R. In such a manner, the arm portion 3, the wire 5a, and the pulley 5b constitute the pressing mechanism, however, any pressing mechanism can be used that presses the contact member 4 against the surface of the rubber sample R. In the present embodiment, the distances of the pressing member 4 and the pin 5c from the rotation shaft 3b are changed, so that the pressure at which the pressing member 4 presses against the rubber sample R can be adjusted.

The anchor member 5 may be any member that can change the pressing load of the contact member 4 against the rubber sample R. In other words, depending on the weight of the anchor member 5, the pressure at which the contact member 4 presses against the surface of the rubber sample R can be changed.

The shape sensor 9a is attached to the casing 10, for example, and detects the cross-sectional shape of the surface of the rubber sample R. The detection data from the shape sensor 9a is inputted into the calculation unit 11. Various sensors can be used for the shape sensor 9a, examples of which include a sensor that detects distance by detecting laser light irradiating the surface of the rubber sample R.

The load sensor 9b is attached to a lower surface at the second end portion in the longitudinal direction of the arm portion 3. The load sensor 9b successively detects the pressing load acting on the contact member 4 and the load in the running direction of the annular belt member B stretched between the pulleys 7a, 7b acting on the contact member 4. In other words, the load sensor 9b successively detects the load in the vertical direction and the horizontal direction acting on the contact member 4 pressing against the belt member B (rubber sample R).

The temperature sensor 9c successively detects the surface temperature of the rubber sample R. The detection data from the load sensor 9b and the temperature sensor 9c is inputted into the control unit 6a.

Next, a testing method for evaluating the scratch abrasion resistance of the rubber sample R using the tester 1 will be described.

The rubber sample R, which is the evaluation object, is fixed to the outer surface of the annular belt member B stretched between the pulleys 7a, 7b, and the drive motor 6 is driven in rotation. Here, the distance between the pulleys 7a, 7b is adjusted so that the belt member B (rubber sample R) is stretched at the desired tension. Additionally, the running speed of the belt member B is set to the desired speed, and the anchor member 5 is manipulated to set the pressing load of the contact member 4 against the surface of the rubber sample R applied by the pressing mechanism to the desired pressing load.

The desired contact member 4 is selected from the various types of contact members 4 (4a, 4b, 4c) and attached to the holding portion 3a. Then, the desired contact member 4 is pressed against the surface of the rubber sample R and the cross-sectional shape of the surface of the rubber sample R is detected by the shape sensor 9a. In the present embodiment, the contact member 4 presses against the surface of the rubber sample R at a position directly above the support portion 17a. The rubber sample R continuously runs with the contact member 4 being pressed thereagainst at a prescribed pressing load. The pointed tips of the contact member 4 scratch the surface of the rubber sample R causing abrasion in a line-like pattern.

According to an embodiment of the present technology, the rubber sample R, which is the evaluation object, can be evaluated under similar conditions to that of actual usage conditions of the conveyor belt 12. In other words, the running speed of the annular belt member B (rubber sample R) stretched between the pulleys 7a, 7b is set to equivalent conditions as the relative speed in the horizontal direction of the conveyor belt 12 and the feed objects to be conveyed S, that is, the difference between the speed in the horizontal direction of the objects to be conveyed S when they are feed on the conveyor belt 12 and the running speed in the horizontal direction of the conveyor belt 12. The pressing load from the contact member 4 is set to equivalent conditions as the pressing load the conveyor belt 12 receives from the objects to be conveyed S, taking into account the amount fed per unit time, the feeding height, and the like.

Additionally, because the annular belt member B is used, the conditions can be very similar to that of the actual usage environment of the conveyor belt 12. Thus, the scratch abrasion resistance of the upper cover rubber 14 (rubber sample R) of the conveyor belt 12 when actually used can be accurately estimated. The effects of tension on the scratch abrasion resistance of the rubber sample R can also be determined.

Figure 3:
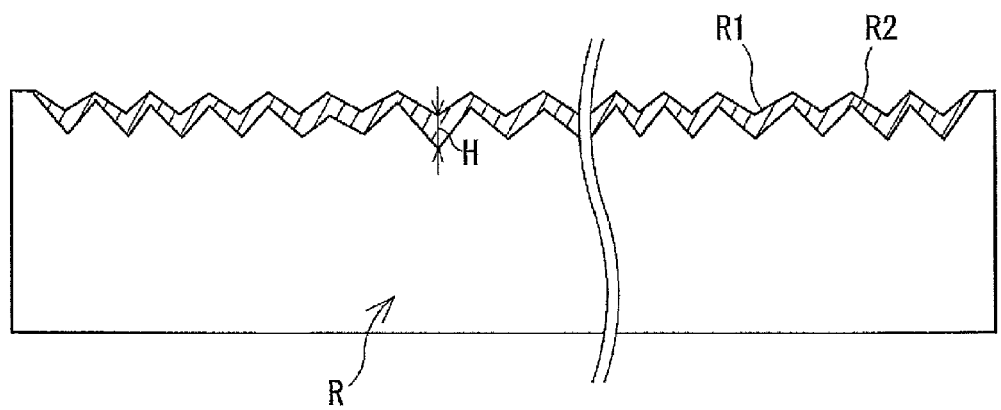
FIG. 3 is an explanatory diagram schematically illustrating a cross-sectional shape in the width direction of a surface of a rubber sample detected by a shape sensor.

In the present embodiment, the calculation unit 11 calculate the scratch abrasion of the rubber sample R on the basis of the detection data from the shape sensor 9a. Specifically, as illustrated in FIG. 3, by finding the vertical variation H between a surface R1 of the previous detection and a surface R2 of the current detection and integrating the obtained values over a section in the width direction of the rubber sample R, the amount of scratch abrasion (area of the hatched portion) of the rubber sample R at the cross section for data detection can be obtained. By performing this calculation for the entire rubber sample R in the longitudinal direction, the amount of scratch abrasion for the entire rubber sample R can be calculated. Alternatively, the amount of scratch abrasion per unit length of the rubber sample R is calculated. In such a manner, the amount of scratch abrasion of the rubber sample R can be quickly determined for a certain period and a certain position (range).

Conventionally, to determine the amount of abrasion of the rubber sample R, the weights of the rubber sample R before and after the rubber sample R is scratched by the contact member 4 are measured, and the amount of abrasion is obtained from the difference between the measured weights. In such cases, the rubber sample R has to be removed from the pair of pulleys 7a, 7b. In particular, in configurations in which both of the pulleys 7a, 7b are rotatably supported on both sides, removing the rubber sample R requires a significant amount of man-hours. However, according to the tester 1, the amount of scratch abrasion of the rubber sample R can be determined without removing the rubber sample R from the pair of pulleys 7a. Thus, the workability is significantly improved.

In the present embodiment, the pulleys 7a, 7b are rotatably supported on one side, however in other embodiments, the pulleys 7a, 7b can be rotatably supported on both sides. A configuration in which the pulleys 7a, 7b are supported on both sides results in the belt member B (rubber sample R) being able to run in a more stable manner. Additionally, because most pulleys of actual conveyor devices are supported on both sides, the conditions can be made even more similar to that of the actual usage environment of the conveyor belt. A configuration in which the pulleys 7a, 7b are supported on both sides requires a significant amount of man-hours to remove the rubber sample R from the pair of pulleys 7a, 7b as described above, however, by using the shape sensor 9a, the man-hours are reduced.

A configuration in which the belt member B and the rubber sample R are not adhered together and can be freely separated is advantageous because the belt member B can be repeatedly used just by replacing only the used rubber sample R. Additionally, when the amount of scratch abrasion of the rubber sample R is determined, severing the rubber sample R in the belt width direction at a position partway in the longitudinal direction allows only the rubber sample R to be easily removed from the pair of pulleys 7a, 7b. Accordingly, the amount of scratch abrasion of the rubber sample R can be determined on the basis of the measured weight of the rubber sample R without using the shape sensor 9a to reduce the required amount of man-hours.

By providing the support portion 17a that supports the inner surface of the belt member B between the pulleys 7a, 7b, the contact member 4 can be pressed against the surface of the rubber sample R at a position where the belt member B is supported by the support portion 17a and a position where the belt member B is not supported. This allows the difference in the scratch abrasion resistance (amount of abrasion, state of abrasion, and the like) of the rubber sample R at two positions to be determined. Accordingly, the scratch abrasion resistance of the upper cover rubber 14 (rubber sample R) of the conveyor belt 12 when actually used can be further accurately estimated.

Additionally, in the present embodiment, the pressing load acting on the contact member 4 (load in the vertical direction) and the load in the running direction of the rubber sample R (load in the horizontal direction) are successively detected. As a result, the kinetic friction coefficient of the rubber sample R can be determined on the basis of the detection data.

Furthermore, in the present embodiment, the external environmental temperature of the rubber sample R can be set to a desired temperature. This allows the evaluation to be performed under conditions even more similar to that of the actual usage environment of the conveyor belt 12. Additionally, by performing evaluation differing the external environmental temperature and the temperature of the rubber sample R, the temperature dependency of the scratch abrasion resistance of the rubber sample R can be determined.

By providing the temperature sensor 9c, the change in surface temperature of the rubber sample R during evaluation can be measured. When the rubber sample R is subject to abrasion, thermal energy is produced, thus the results of the temperature measurement by the temperature sensor 9c can be used to determine the energy produced when abrasion occurs. Because the amount of energy differs depending on the type of rubber used, the temperature measurement results are helpful in selecting the type of rubber that can minimize the energy produced, for example.

Figure 4:
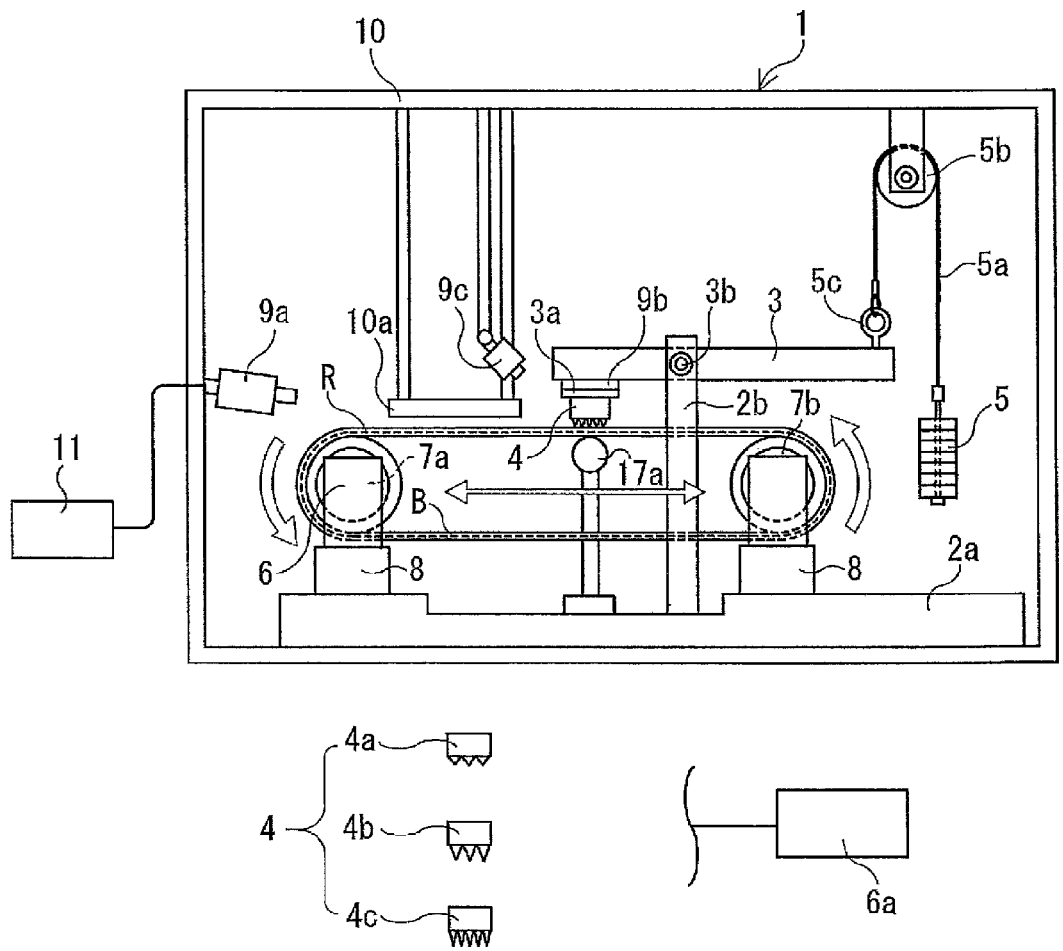
FIG. 4 is an explanatory diagram illustrating, in a front view, a scratch abrasion tester according to another embodiment.

In an abrasion tester 1 of another embodiment illustrated in FIG. 4, the support portion 17a supporting the inner surface of the annular belt member B between the pulleys 7a, 7b can move in the running direction of the belt member B and be fixed at a discretionary position. In other respects, the basic configuration is the same as that of the previously described embodiment. The support portion 17a can be a support roller as in the present embodiment instead of a flat plate-like support portion. The span in which the support portion 17a can move (the support length of the belt member B which is pressed by the contact member 4) can be changed. Accordingly, by pressing the contact member 4 against the surface of the rubber sample R and performing measurement with the support portion 17a at a position so that the belt member B is not supported, the effect of the span on the scratch abrasion resistance can be determined.

Additionally, the mechanism that enables the support portion 17a to move is not particularly limited. The mechanism may enable movement with or without gradations. Examples of a mechanism that enables the support portion 17a to move include disposing rails on the base 2a to enable the support portion 17a to slide on the rail.

Figure 5:
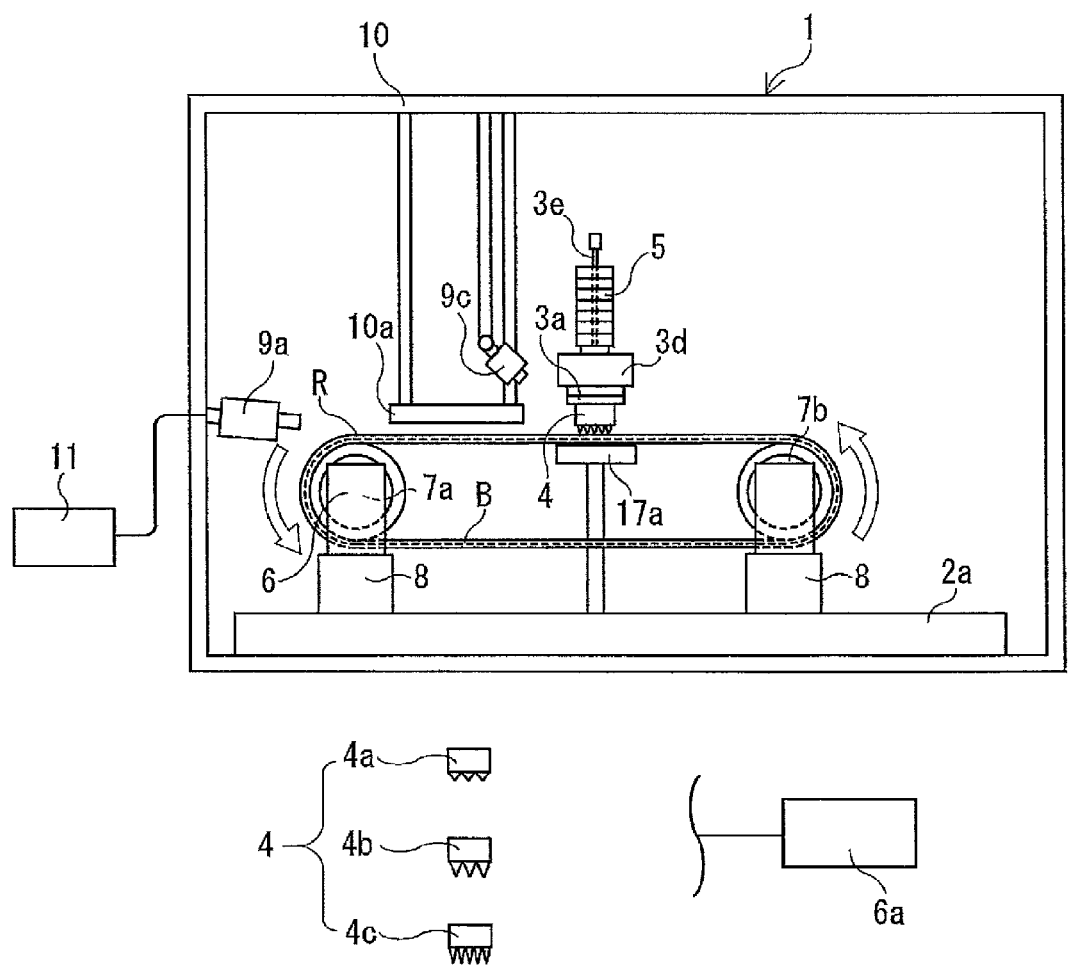
FIG. 5 is an explanatory diagram illustrating, in a front view, a scratch abrasion tester according to yet another embodiment.

In an abrasion tester 1 according to another embodiment illustrated in FIG. 5, the pressing mechanism which presses the contact member 4 against the surface of the rubber sample R is different than that of the previously described embodiment. In other respects, the basic configuration is the same as that of the previously described embodiment.

The pressing mechanism according to the present embodiment includes a plurality of anchor members 5 placed on the contact member 4. Specifically, the pressing mechanism includes a base 3d to which the holding portion 3a mounted on the upper end portion of the contact member 4 is attached, a supporting column 3e disposed in an upright manner on the base 3d, and the plurality of anchor members 5 through which the supporting column 3e passes through. The anchor members 5 are placed on the base 3d in a layered manner. The base 3d is supported by another member so that it does not move out of position in the horizontal direction.

In the present embodiment, essentially the total weight of the base 3d, the supporting column 3e, and the anchor members 5 acts on the surface of the rubber sample R via the contact member 4. Accordingly, the pressure against the surface of the rubber sample R can be changed by changing the number of the anchor members 5 and the weight of each of the anchor members 5.

Additionally, essentially the pressing mechanism acts only as a load in the vertical direction on the contact member 4 and the rubber sample R. As a result, variation in the load in the horizontal direction acting on the contact member 4 and the rubber sample R can be significantly reduced. This allows for a highly accurate measurement with minimal noise, which is advantageous because the scratch abrasion resistance and the kinetic friction coefficient of the rubber sample R can be estimated with greater accuracy.

Furthermore, according to this pressing mechanism, essentially a load only in the vertical-downward direction is placed on the rubber sample R, making the rubber sample R less susceptible to movement up or down. As a result, up and down vibration of the rubber sample R caused by the running of the rubber sample R can be effectively suppressed. In this way also, a highly accurate measurement with minimal noise can be performed which is advantageous because the scratch abrasion resistance and the kinetic friction coefficient of the rubber sample R can be estimated with greater accuracy. Additionally, the pressing mechanism can also be simplified.

The invention claimed is:

1. A scratch abrasion tester, comprising:
    a pair of pulleys;
    an annular belt member stretched between the pair of pulleys;
    a rubber sample fixed to an outer surface of the belt member;
    a contact member with pointed tips that are able to come into contact with a surface of the rubber sample;
    a pressing mechanism that presses the tips of the contact member against the surface of the rubber sample;
    an anchor member for changing a pressing load applied by the contact member;
    a shape sensor configured to detect a cross-sectional shape of the surface of the rubber sample; and
    a calculation unit configured to obtain an amount of scratch abrasion of the rubber sample on the basis of detection data from the shape sensor;
    a running speed of the rubber sample being variable,
    the contact member including a plurality of types of contact members with different tip specifications,
    the contact member that presses against the surface of the rubber sample being discretionarily selected from the plurality of types of contact members, and the selected contact member being pressed against the surface of the rubber sample.

2. The scratch abrasion tester according to claim 1, further comprising
    a load sensor configured to successively detect the pressing load acting on the contact member and a load in a running direction of the rubber sample acting on the contact member.

3. The scratch abrasion tester according to claim 1, further comprising
    a temperature control mechanism configured to vary an external environment temperature of the rubber sample.

4. The scratch abrasion tester according to claim 1, further comprising
    a temperature sensor configured to detect a surface temperature of the rubber sample.

5. A scratch abrasion testing method in which an annular belt member with a rubber sample fixed to an outer surface thereof is stretched between a pair of pulleys and a contact member with pointed tips is pressed against a surface of the rubber sample by a pressing mechanism, the testing method comprising the steps of:
    for testing,
    setting a running speed of the rubber sample to a desired speed;
    setting a pressing load applied by the contact member to a desired pressing load via an anchor member;
    selecting, as the contact member, a desired contact member from a plurality of types of contact members with different rubber sample surface contacting tip specifications;
    pressing the selected contact member against the surface of the rubber sample;
    detecting a cross-sectional shape of the surface of the rubber sample using a shape sensor; and
    obtaining an amount of scratch abrasion of the rubber sample using a calculation unit on the basis of detection data from the shape sensor.

* * * * *